M. COHEN.
FENDING DEVICE.
APPLICATION FILED NOV. 20, 1913.

1,097,537.

Patented May 19, 1914.

2 SHEETS—SHEET 1.

WITNESSES
Frank C. Palmer,
J. L. McAuliffe

INVENTOR
Max Cohen
BY Munn & Co
ATTORNEYS

M. COHEN.
FENDING DEVICE.
APPLICATION FILED NOV. 20, 1913.
1,097,537.
Patented May 19, 1914.
2 SHEETS—SHEET 2.
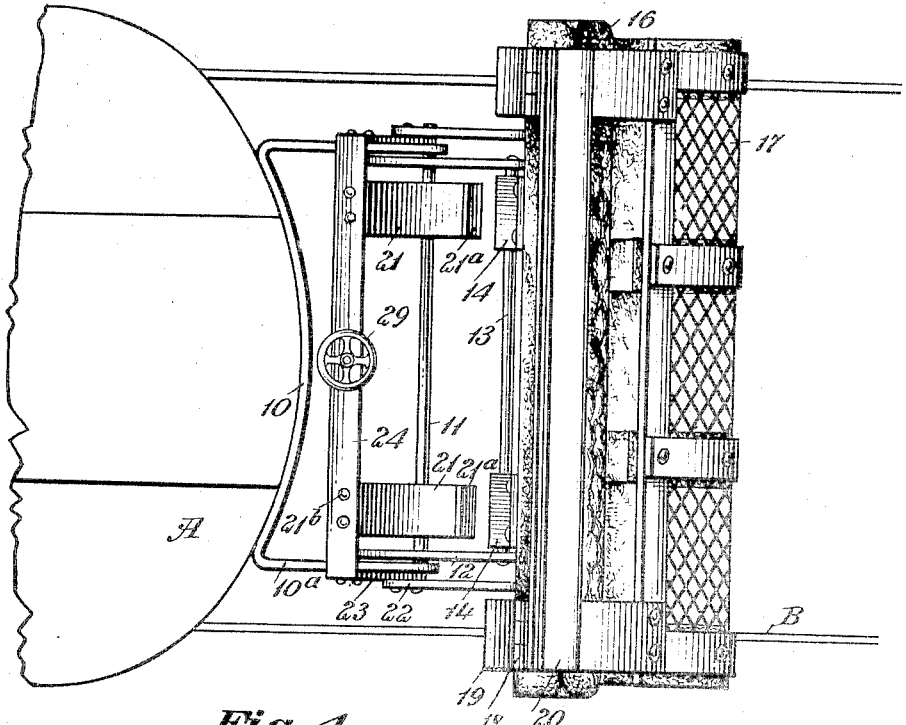
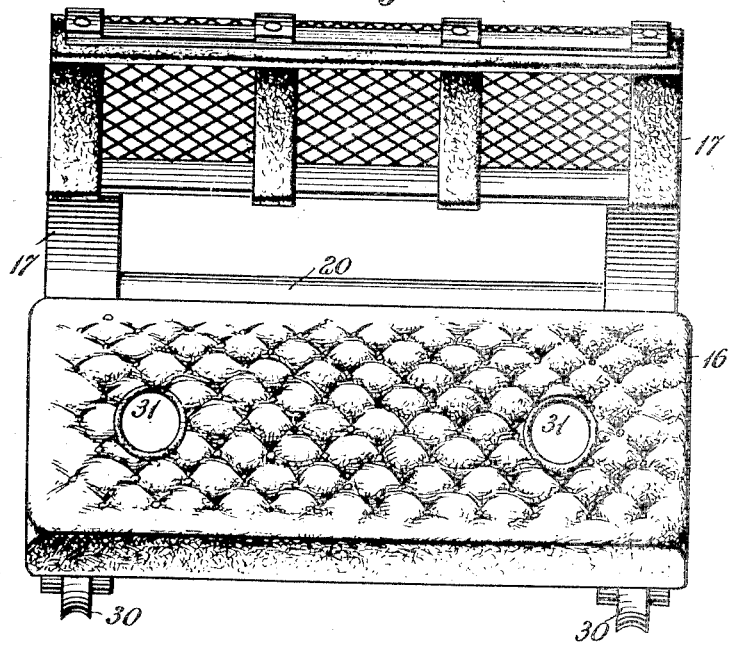
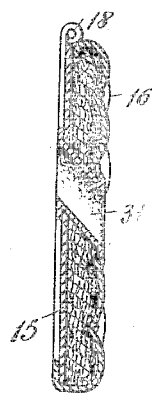
WITNESSES
Frank C. Palmer
J. L. McAuliffe
INVENTOR
Max Cohen
BY Munn & Co
ATTORNEYS

UNITED STATES PATENT OFFICE.

MAX COHEN, OF NEW YORK, N. Y., ASSIGNOR OF ONE-HALF TO HIMSELF AND ONE-HALF TO BENJAMIN BORER, OF NEW YORK, N. Y.

FENDING DEVICE.

1,097,537.  Specification of Letters Patent. Patented May 19, 1914.

Application filed November 20, 1913. Serial No. 802,054.

*To all whom it may concern:*

Be it known that I, MAX COHEN, a subject of the Czar of Russia, at present residing in the city of New York, borough of Manhattan, in the county and State of New York, have invented a new and Improved Fending Device, of which the following is a full, clear, and exact description.

My invention relates to a fending device adapted to be applied to street cars, automobile cars, or other vehicles, and the invention more especially relates to a device of this character having a movable shield mounted thereon and adapted to be automatically dropped in front of the fender proper, to shield a person struck by the latter to prevent the person from being rolled or thrown to a position to be run over by the car.

The fending device carrying the shield is mounted in a novel manner and is capable of vertical and pivotal movement, means being provided to normally sustain the fender proper disposed in a downwardly inclined position to contact by its lower forward end with any person struck by the said fender, so that the impact will release the fender, and permit it to assume a more vertical position and rock rearwardly. The movement of the fender releases the shield and permits the latter to drop in front of the fender and hold and carry the person struck.

The invention will be particularly explained in the specific description following.

Reference is to be had to the accompanying drawings forming a part of this specification, in which similar characters of reference indicate corresponding parts in all the views.

Figure 1:
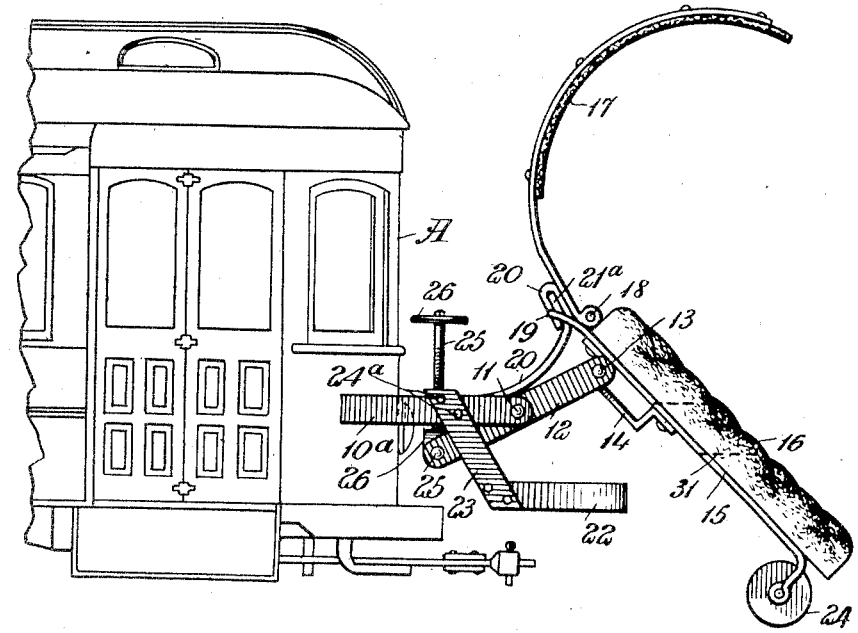
Figure 2:
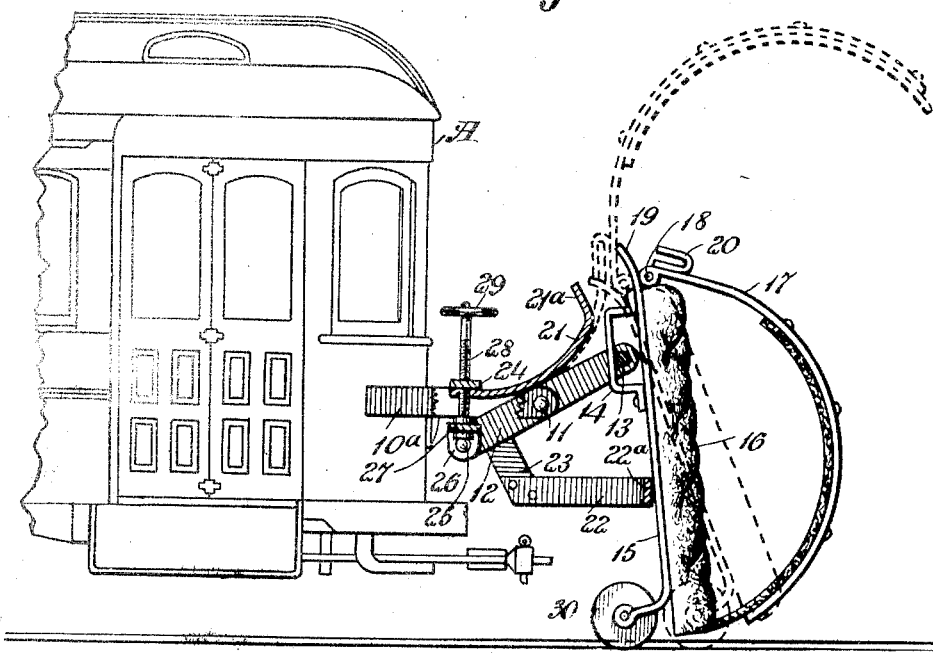

Figure 1 is a side elevation of a fending device embodying my invention, showing the same applied to a street car, the shield associated with the fender proper being in a raised position; Fig. 2 is a partially sectional side elevation showing the fender proper in the rearward lower position and the shield dropped in front of the same; Fig. 3 is a plan view with the parts in the position shown in Fig. 2; Fig. 4 is a front view of the fender proper detached and showing an arrangement of openings therein for the passage of light from lamps positioned as on an automobile; and Fig. 5 is a vertical section of the cushion of the fender proper, the view indicating the character of the light openings.

The fending device may be applied to a street car A, or to an automobile or other vehicle, and may be supported thereon by any suitable means. For the purpose of illustration I have shown a transversely curved bracket 10, presenting at each end forwardly disposed side arms 10$^a$ and hereinafter referred to as a supporting frame. To the forward ends of the arms 10$^a$, a transverse rod 11 is secured on which arms 12 are pivoted, between the ends of said arms 12. The forward ends of the arms 12 are united by a cross bar 13, which is embraced by vertical keepers 14 on the back frame 15 of a cushion or fender proper, 16. At the top of the fender 16 a shield 17 is hinged as at 18, said shield being curved forwardly and downwardly. The shield 17, when in the raised position, rests adjacent to its hinges 18 on the upwardly extending members 19 formed on the back frame 15 of the fender proper 16, and it is provided adjacent to the hinges with a transverse U-bar 20, which constitutes a hook adapted to engage over the resilient upper ends 21$^a$ of sustaining arms 21, said arms 21 being disposed at each side to extend forwardly from a frame element hereinafter referred to.

The arrangement is such that the fender proper 16 will normally project downwardly and forwardly, as in Fig. 1, with the shield 17 in the raised position, the U-bar 20 or other equivalent hook elements engaging over the rearwardly and upwardly inclined ends 21$^a$ of the arms 21. Upon impact of the fending device against a person or other obstruction, the fender 16 will be forced rearwardly, being capable of a rocking movement on the cross bar 13. When nearing the rearward position, the lower end of the fender 16 will contact with the ground or car track, and the fender will assume a vertical position, being free to have a vertically sliding movement in addition to its rocking movement on the cross bar 13, by reason of the keepers 14 embracing said cross bar. The rising movement of the upper end of the fender 16 will detach the U-bar 20 from the sustaining arms 21, and the shield 17 will be thus released and will drop to the position shown in full lines in Fig. 2, in front of the fender 16, thereby grasping the person struck and securely holding him to prevent his being rolled in a position to be run over.

It is to be understood that the sustaining arms 21 have a strength to maintain the fender 16 and shield, but the outer ends 21ª thereof and the adjacent portions of the arms will have sufficient resiliency to yield to the strains exerted by the rearward and upward movement of the said fender, to permit the release of the U-bar 20.

To limit the rearward swinging movement of the fender 16, a stop is provided on the securing frame. As here shown, the stop comprises a U-shaped frame member 22, the cross bar 22ª of which ranges transversely at the back of the fender 16, and said frame is formed upon or secured to hangers 23 which depend from a cross bar 24 and suitable connection is made with the securing frame or bracket 10. In the example shown, rivets 24ª or equivalent expedients are employed to secure the hangers 23 to the arms 10ª.

In order to provide for the adjustment of the cross bar 13 on which the fender 16 has swinging and sliding movement, the rear ends of the arms 12 carrying said cross bar are pivoted, as at 25, to lugs 26 on a cross bar 27, and to said cross bar a threaded spindle 28 is swiveled, said spindle taking into the cross bar 24, and the said spindle at the upper end having a hand wheel 29 to turn the same and thus raise or lower the rear ends of the arms 12 and thus raise or lower the height of the cross bar 13. The arms 21, with the ends of which the shield 17 has hooked engagement, are secured preferably to the cross bar 24 as for instance by rivets 21ᵇ. The fender 16 is provided with openings 31 extending through the same from front to rear, and the position of these openings is determined by the position of the head light or head lights on the car, automobile or other vehicle to which the invention is applied. In Fig. 4, I have shown the openings spaced to conform to the usual position of the two head lights on an automobile.

As will be seen from Fig. 5, the openings 31 for the passage of light rays are given a downward inclination from front to rear relatively to the general plane of the fender 16, in order that when the said fender is disposed in a normal position, as in Fig. 1, the openings will be horizontal.

The mounting of the fender 16 and the arrangement of the elements 20—21 are such that the said fender will be maintained with its lower end above the ground or above the track rails B, in the case of a railway track, so that the fending device will not be subject to the unevenness of a road or track. The lower end of the fender 16 is preferably provided with wheels or rollers 30 to contact with the ground or track when the said fender drops to a rearward position.

The described construction affords a practical means for carrying my invention into effect, and I would state in conclusion, that I do not limit myself strictly to the mechanical details herein illustrated, since manifestly the same can be considerably varied without departure from the spirit of the invention.

Having thus described my invention I claim as new and desire to secure by Letters Patent:

1. In a fending device, a supporting frame, a fender proper, vertically adjustable supporting means on the said frame on which the said fender is mounted for swinging and vertically sliding movement relatively to said supporting means, and means for temporarily holding the fender proper against movement on said adjustable means.

2. In a fending device for vehicles, a securing frame, side arms pivotally mounted on said frame to rock vertically, a cross bar extending transversely between the side arms, means for moving the arms on their pivots to raise or lower the cross bar, a fender proper having keepers at the rear sides thereof, through which the said cross bar passes, to permit a swinging and sliding movement of said fender proper relatively to the cross bar, a stop in the rear of the fender proper to limit its rearward movement, a shield hinged to the fender proper, at the upper end thereof, and adapted to drop to a lowered position in front of the fender proper, a hook on said shield, and arms on the said frame extending forwardly and provided with upwardly extending members adapted to be engaged by the hook on the shield.

3. In a fending device, a supporting frame, a fender proper movably mounted on said frame to yield under the force of impact, a shield hinged to the fender proper to drop from a raised position to a lowered position in front of the fender proper, rests on the fender proper against which the said shield contacts when in the raised position, and co-acting releasable members on the frame and shield, to hold the shield and fender proper in the raised position, said members comprising resilient arms having upwardly extending ends, and a down-turned U-element on the shield.

4. In a fending device, a supporting frame, a fender proper movably mounted on said frame to yield to the force of impact, a shield hinged to the fender proper, at each end, to assume a raised or lowered position, a U-bar on the shield adjacent to the hinged end, and arms on the frame terminating in resilient members adapted to be engaged by the said U-bar.

5. In a fending device, a rigid supporting frame, fender-supporting side arms pivoted between their ends on said rigid frame, a cross bar uniting said side arms at their forward ends, adjusting devices at the rear ends of the arms to rock the same vertically on their pivots to vary the height of the cross bar, a fender slidably engaging the cross bar to move up and down relatively thereto and adapted to swing in a vertical plane on said bar, a rigid stop projecting forwardly below the supporting arm to arrest the rearward swinging of the fender, a shield pivotally carried by the fender above said cross bar, and latch means for the shield releasable by the fender to permit the shield to drop.

In testimony whereof I have signed my name to this specification in the presence of two subscribing witnesses.

MAX COHEN.

Witnesses:
J. L. McAuliffe,
Philip D. Rollhaus.